(12) United States Patent
Golden et al.

(10) Patent No.: US 11,927,976 B2
(45) Date of Patent: *Mar. 12, 2024

(54) UTILITY CONSOLE FOR CONTROLLING ENERGY RESOURCES

(71) Applicant: GridPoint, Inc., Reston, VA (US)

(72) Inventors: Brian Golden, Great Falls, VA (US); Courtney McMahan, Arlington, VA (US); David Hakim, Silver Spring, MD (US); Edward Shnekendorf, Falls Church, VA (US)

(73) Assignee: GRIDPOINT, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,113

(22) Filed: May 20, 2021

(65) Prior Publication Data

US 2022/0147088 A1 May 12, 2022

Related U.S. Application Data

(63) Continuation of application No. 16/405,092, filed on May 7, 2019, now Pat. No. 11,022,994, which is a (Continued)

(51) Int. Cl.
| | |
|---|---|
| G05B 15/02 | (2006.01) |
| G05F 1/66 | (2006.01) |
| G06N 5/04 | (2023.01) |
| H02J 3/32 | (2006.01) |
| H04L 67/10 | (2022.01) |

(52) U.S. Cl.
CPC ............... *G05F 1/66* (2013.01); *G05B 15/02* (2013.01); *G06N 5/04* (2013.01); *H02J 3/32* (2013.01); *H04L 67/10* (2013.01); *G05B 2219/2642* (2013.01); *Y02B 70/30* (2013.01); *Y02P 80/10* (2015.11); *Y04S 20/20* (2013.01)

(58) Field of Classification Search
None
See application file for complete search history.

(56) References Cited

U.S. PATENT DOCUMENTS

| | | |
|---|---|---|
| 4,264,960 A | 4/1981 | Gurr |
| 5,572,438 A | 11/1996 | Ehlers et al. |

(Continued)

*Primary Examiner* — Ryan A Jarrett
(74) *Attorney, Agent, or Firm* — Bookoff McAndrews, PLLC

(57) ABSTRACT

A system and method for managing power consumption and storage in a power grid. Measurements are received from a plurality of geographically distributed energy management controllers. Each energy management controllers has energy storage units with stored energy. The measurements comprise the energy production and storage capacity of the energy management controllers and their associated energy storage units. The measurements are processed, e.g., aggregated, and displayed on a graphical user interface. Commands are transmitted to a first subset of the energy management controllers to command the units to discharge their stored energy into a power grid through an inverter. Commands are transmitted to a second subset of the plurality of energy management controllers to store energy in each unit's energy storage unit.

19 Claims, 15 Drawing Sheets

Related U.S. Application Data continuation of application No. 15/435,535, filed on Feb. 17, 2017, now abandoned, which is a continuation of application No. 14/508,119, filed on Oct. 7, 2014, now abandoned, which is a continuation of application No. 11/968,941, filed on Jan. 3, 2008, now Pat. No. 8,855,829.

(60) Provisional application No. 60/878,072, filed on Jan. 3, 2007.

(56) References Cited

U.S. PATENT DOCUMENTS

| | | |
|---|---|---|
| 6,750,391 B2 | 6/2004 | Bower et al. |
| 6,862,498 B2 | 3/2005 | Davis et al. |
| 6,874,691 B1 | 4/2005 | Hildebrand et al. |
| 7,135,956 B2 | 11/2006 | Bartone et al. |
| 8,855,829 B2 | 10/2014 | Golden et al. |
| 11,022,994 B2 * | 6/2021 | Golden ............... G05F 1/66 |
| 2003/0036820 A1 | 2/2003 | Yellepeddy et al. |
| 2003/0182023 A1 | 9/2003 | Perez |
| 2004/0088083 A1 | 5/2004 | Davis et al. |
| 2006/0190140 A1 | 8/2006 | Soni |
| 2006/0276938 A1 | 12/2006 | Miller |
| 2007/0005195 A1 | 1/2007 | Pasquale et al. |
| 2008/0172312 A1 | 7/2008 | Synesiou et al. |

* cited by examiner

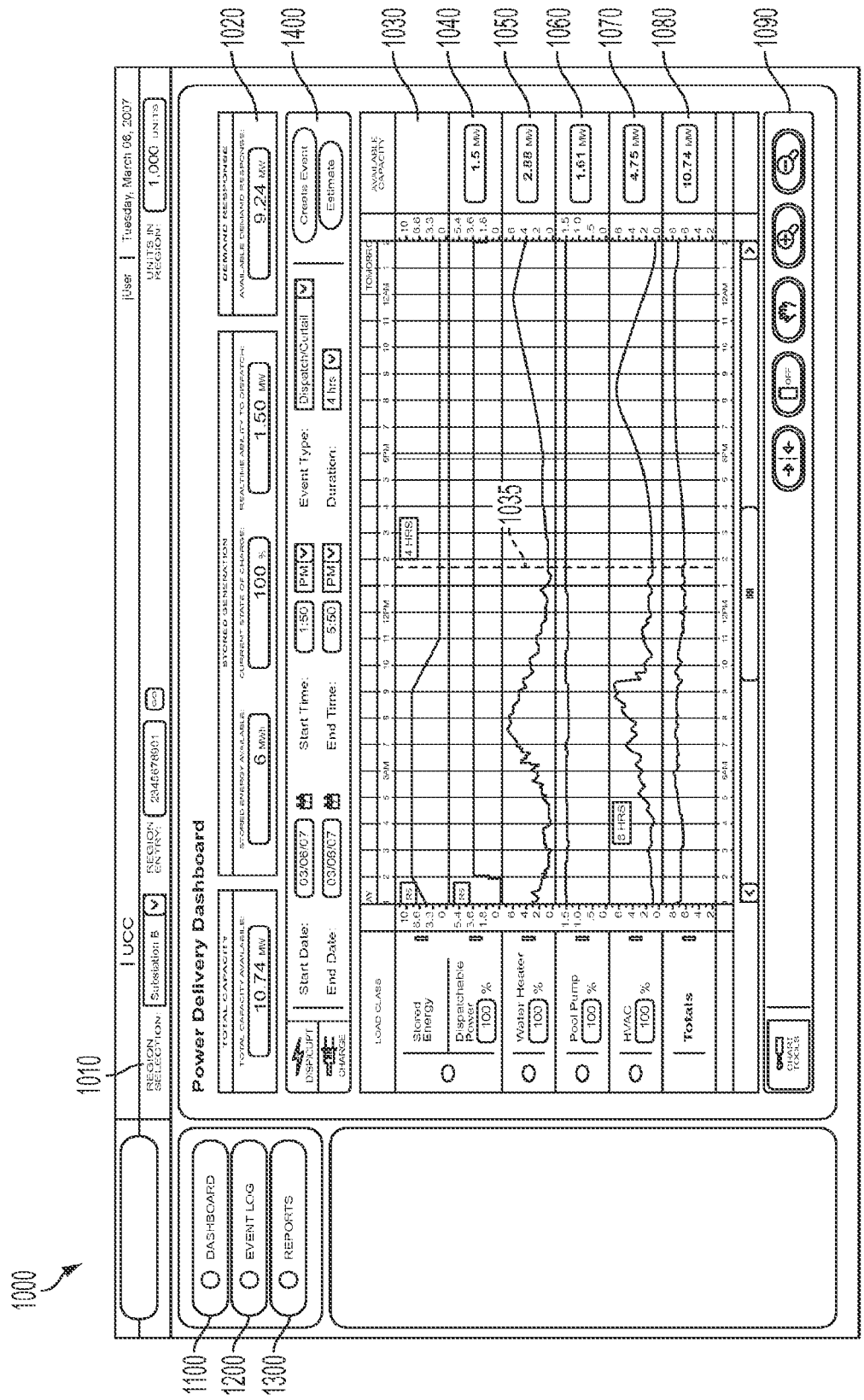
FIG. 5 MAP

FIG. 6 MAP

FIG. 7 MAP

FIG. 7B

UTILITY CONSOLE FOR CONTROLLING ENERGY RESOURCES

RELATED APPLICATIONS

This application is a continuation of and claims the benefit of priority to U.S. patent application Ser. No. 16/405,092, filed May 7, 2019, which is a continuation of and claims the benefit of priority to U.S. patent application Ser. No. 15/435,535, filed Feb. 17, 2017, which is a continuation of and claims the benefit of priority to U.S. patent application Ser. No. 14/508,119, filed Oct. 7, 2014, which is a continuation of and claims the benefit of priority to U.S. patent application Ser. No. 11/968,941, filed Jan. 3, 2008, now U.S. Pat. No. 8,855,829, which claims the benefit of priority to U.S. Provisional Application No. 60/878,072, filed Jan. 3, 2007, each of which are hereby incorporated herein by reference in their entirety.

This application includes material which is subject to copyright protection. The copyright owner has no objection to the facsimile reproduction by anyone of the patent disclosure, as if appears in the Patent and Trademark Office files or records, but otherwise reserves all copyright rights whatsoever.

FIELD OF THE INVENTION

The present invention relates generally to energy management, and more particularly to a system and method for controlling energy resources, such as distributed energy storage units optionally coupled to renewable energy sources such as solar panels.

BACKGROUND OF THE INVENTION

There has been an increasing emphasis in recent years on energy conservation. Electric utilities have also come under increasing pressure to reduce the need to fire up polluting power plants to serve peak demands, such as during hot summer days. Electric utilities also have an incentive to "smooth out" energy demand to minimize the need to install new power lines across limited real estate.

Two ways in which utilities can perform these tasks are referred to as "demand side management" and "supply side management." Demand side management refers to the selective reduction of energy demand in response to peak loading conditions. For example, utilities have for years installed devices in the homes of participating consumers that, under utility control, selectively disable energy-consuming devices (e.g., hot water heaters or air conditioning units) in response to peak loading conditions. As another example, utilities are able in certain cases to remotely activate energy supplies to increase the supply of electricity to parts of the electricity grid.

It would be advantageous to provide more sophisticated control mechanisms to permit electric utilities and others to effectively monitor and control distributed energy resources, such as storage units capable of storing electricity and reselling it to the grid on command. It would also be advantageous to provide more sophisticated demand side management tasks using aggregated resources.

SUMMARY OF THE INVENTION

In one embodiment, the invention is directed to a system and method wherein measurements are received from a plurality of geographically distributed energy management controllers. Each energy management controller has energy storage units with stored energy. The measurements comprise the energy production and storage capacity of the energy management controllers and their associated energy storage units. The measurements are processed and displayed. Such processing may include, e.g., aggregation. Commands are transmitted to a first subset of the energy management controllers to command the units to discharge their stored energy into a power grid through an inverter. Commands are transmitted to a second subset of the plurality of energy management controllers to store energy in each unit's energy storage unit.

In another embodiment, the invention is directed to a system and method. Measurements are received from a plurality of geographically distributed energy management controllers. At least one of the energy management controllers is coupled to at least one load management device capable of curtailing load to at least one power consuming device. The measurements comprise actual electrical load reflecting consumption attributable to at least one power consuming device. The measurements are processed by, e.g., aggregating the measurements. Commands are transmitted to the energy management controller to cause the controller use the load management controller to curtail the load of the at least one power consuming device.

In another embodiment, the invention is directed to a system and method. Measurements are received from an energy management controller at a consumer location. The measurements comprise actual electrical load reflecting consumption attributable to the at least one power consuming device. Additional information is received from a consumer at the consumer location reflecting changes in energy uses. Measurements are fed as inputs into rules, and based upon the results of processing those rules, energy consumption/production needs are recalculated and actions are suggested or automatically taken to reduce/increase load, increase/decrease energy storage, or activate/deactivate power generation at the consumer site.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

DETAILED DESCRIPTION OF EMBODIMENTS OF THE INVENTION

Figure 1:
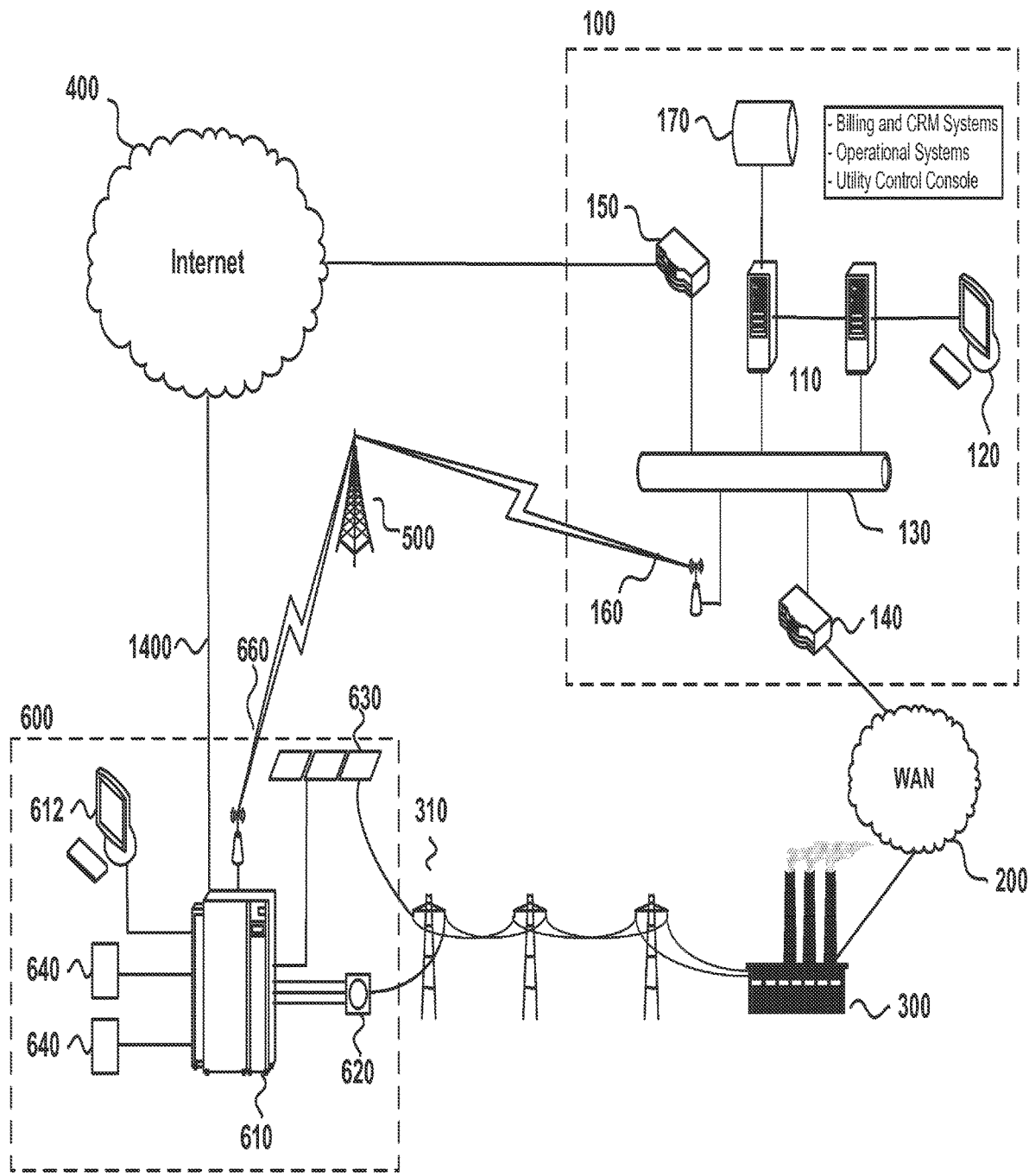
FIG. 1 illustrates an embodiment of a physical system and network which is capable of supporting at least one embodiment of the disclosed system and method.

The present invention is described below with reference to block diagrams and operational illustrations of methods and devices to manage power generation, consumption, and storage. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to hardware and/or software which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "utility" should be understood to refer to an entity that, provides or manages the supply of electrical power to one or more energy consumers. The term as used in this disclosure encompasses, without limitation, regional utility companies, regional transmission organizations, and any other load servicing entities or entities which manage the power grid within a geographical area. Energy consumers may be any entity that use electrical power for any purpose such as, without limitation, individual home owners, commercial office buildings, or manufacturing operations.

For the purposes of this disclosure, the term "energy management controller" should be understood to refer to any device which measures and controls the operation of power generating, power consuming, or power storage devices, or which measures and controls power supplied to one or more electrical circuits. Power generating devices may include, without limitation, renewable energy sources such as solar panels, or may include conventional generators powered by fossil fuels. Power consuming devices may include, without limitation, household appliances such as refrigerators and stoves, climate control systems such as heating and air conditioning, and commercial or manufacturing devices, such as an automated assembly line. Power storage devices may include, without limitation, battery systems and capacitors.

Energy management controllers may be capable of being connected to one or more networks, such as the Internet, a private WAN, or a cellular communication network. Such network connected controllers may be capable of transmitting measurements made by the controllers to remote locations. Network connected controllers may be further capable of receiving commands from remote locations which control or modify the operation of the controllers For the purposes of this disclosure the term "power control appliance" should be understood to refer to an energy management controller which is capable of managing substantially all electrical power generation, consumption, and storage by power generating, power consuming, and power storage devices within an area of control. The power control appliance may a be a processor with associated communications, data storage and database facilities, one or more display device which may support a graphical user interface, as well as operating software and one or more database systems and applications software which support the services provided by the appliance. An area of a control of a power appliance may be, without limitation a single home or factory, a group of homes or factories, or a commercial building.

For the purposes of this disclosure the term "utility console" and "utility control console" should be understood to refer to one or more servers and associated applications software which implements a graphical user interface that allows a utility to manage power consumption, generation, and storage within one or more areas of control. The utility console may provide for software and hardware interfaces that allow the utility console to communicate with and control one or more energy management controllers within the utility's areas of control.

For the purposes of this disclosure a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules.

Reference will now be made in detail to illustrative embodiments of the present invention, examples of which are shown in the accompanying drawings.

In one embodiment, the disclosed system and method is directed to a utility console that enables a utility to monitor and aggregate potential electrical energy stored in a plurality of geographically dispersed devices, such as batteries and capacitors. Commands from the utility console may be transmitted to the plurality of geographically dispersed energy management controllers, causing them to transmit power through inverters to a power grid, creating a "virtual power plant." The utility console may also monitor actual demand through circuits at geographically dispersed locations, aggregate the demand, and issue commands to curtail loads to reduce the aggregated demand.

FIG. 1 illustrates an embodiment of a physical system and network which is capable of supporting at least one embodiment of the disclosed system and method. A utility has an operations control center 100. Within the control center 100, one or more servers 110 host applications software which implement various applications including a utility console. Such applications software may additionally implement other applications systems, such as billing and CRM systems, and other operational support systems. The servers 110 have at least one display device 120 that is capable of supporting a graphical user interface. The servers 110 are additionally connected to one or more storage devices 170 which may provide for storage of one or more actively used databases or which may provide backup or archiving of data collected by the servers.

The servers are connected to the local network 130 of the operations control center. The local network 130 is connected to the Internet 400 though conventional routers and/or firewalls 150. The local network 130 may also be connected to a common carrier wireless network 500 such as a CDMA network. The local network 130 is also connected to a wide area network 200 which is connected to one or more power generation points 300.

The power generation point 300 is connected to the operations control center 100 through the wide area network and is connected to consumers 600 though power transmission lines 310. The power transmission lines 310 additionally support transmission of data between the power generation point 300 and power consumers 600. Thus, the servers 110 may receive data from or transmit data or commands to distributed energy management controllers 610 using the Internet 400, the wireless network 500, or the WAN 200.

Power consumers 600 under the management of the utility control center 100 have one or more power control appliances 610. Power is transmitted to the consumer 600 over transmission lines 310 which form part of the local power grid. Power the consumer draws from the grid may be supplied, in part, by one or more power generation points 300, or may originate in remote locations (not shown). Power enters the consumer premises at a meter 620 and is routed to the power control appliance 610, which, may comprise an onboard computer, energy storage, and an inverter/charger.

The power control appliance 610 may be configured to control one or more electrical circuits which supply power to one or more power consuming devices 640, such as household appliances. In one embodiment, the system uses a number of load controllers with integrated measurement and/or a communicating thermostat (not shown). Load controllers with integrated measurement can be installed by placing them inline with the circuit to be measured and controlled, and are usually installed near the main load panel (though there is no requirement to do so). Any number of load controllers with integrated measurement may be installed at a site. The communicating thermostat can be a replacement for an existing thermostat and can work with nearly any HVAC system. HVAC curtailment can be achieved either by interrupting power to the compressor or by communicating with the thermostat to adjust the temperature setpoint or to turn the HVAC system off. The power control appliance may additionally have control connections (not shown) to the power consuming devices 640 which allow the power control appliance 610 to control the operation of the devices.

The power control appliance 610 may be further connected to one or more power generation devices 630, such as solar panels, which are capable of generating power. Power generated by the power generation devices 630 may is routed to the power control appliance 610 for use by the consumer. Under the control of the power control appliance 610 power generated by the power generation devices 630 may also be routed, in-whole, or in-part, to the power grid 310.

The power control appliance 610 may be controlled, at least in part by the consumer, using a graphical user interface displayed on a display device 612. The power control appliance 610 may be further controlled remotely by the utility control center 100. In one embodiment, the servers 110 at the utility control center 100 may receive and transmit data and commands to the power appliance using the Internet 400, the wireless network 500, or the WAN 200 (via power lines 310 from the power generation point.)

Examples of power control appliances which may be used in embodiments of the present system are described in detail in U.S. Patent Application 2006/0158037, entitled "Fully Integrated Power Storage and Supply Appliance with Power uploading Capability," and U.S. Pat. No. 7,274,975, entitled "Optimized Energy Management System,", both of which are incorporated by reference herein.

It is understood that the system and network illustrated in FIG. 1 is not limited to the control of power consumption, generation, and storage exclusively at consumer sites 600. The system may manage any resource under the control of an energy management controller connected to the utility control center through a network connection. For example, there may be grid-connected energy storage units, such as capacitor banks, which are owned and operated by the utility expressly for grid management purposes. The system may measure and control such resources, for example, using facilities provided by a utility console provided by software implemented on the servers 110.

Figure 2:
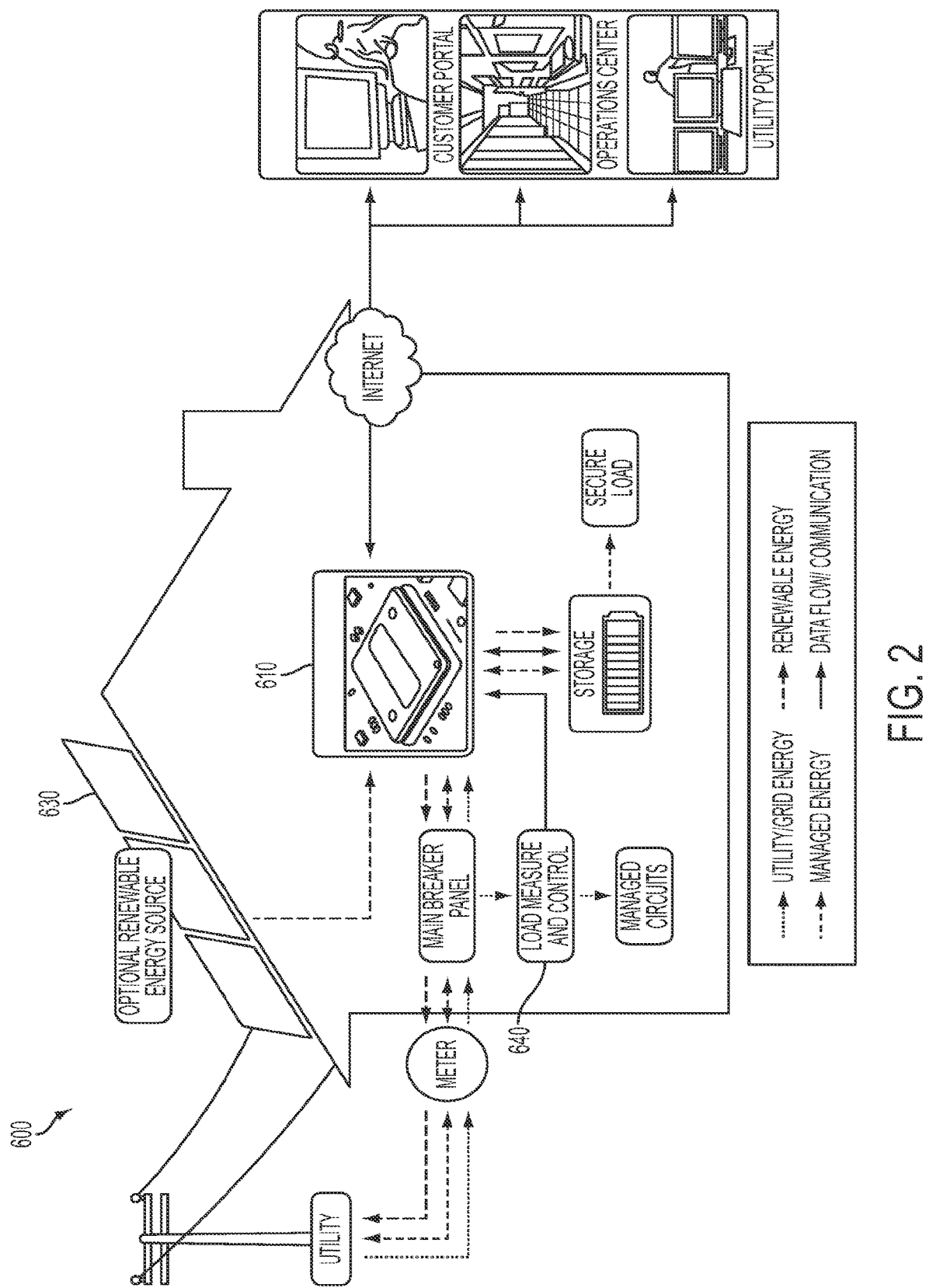
FIG. 2 illustrates another embodiment of a power control system which may be implemented at a consumer site such as a residential house or a business in a location geographically dispersed from a utility generation plant.

FIG. 2 illustrates another embodiment of a power control system which may be implemented at a consumer site 600 such as a residential house or a business in a location geographically dispersed from a utility generation plant. An energy management controller unit 610 implements supply and demand side management functions. The unit 610 is optionally coupled to one or more renewable energy sources 630 such as solar panels, and which may include one or more batteries (not shown) to store electricity. One or more load measurement and control circuits 640 are electrically coupled to managed circuits which may include, for example an HVAC system, a hot water heater, pool pump, and other circuits.

The load measurement and control circuits 640 can measure energy usage and report it to the energy management controller unit 610, which may in turn report it to an operations center 100, which in turn reports it to a utility control console located at the utility's facility. In one embodiment, electric utility is enabled to have a real-time snapshot of actual storage capacity at the distributed energy management control units and the current loads operating across all the premises in which such geographically dispersed energy management control units are located.

In one embodiment, the electric utility can issue commands to the energy management control units 610 through a smart meter (which receives commands through the transmission lines), the Internet, or other communication mechanism as described above. The utility may additionally gather data on energy usage and conservation from energy management control units and implement a monitoring and conservation website hosted, for example, on control center servers, to allow consumers to monitor their energy usage and conservation patterns.

Figure 3:
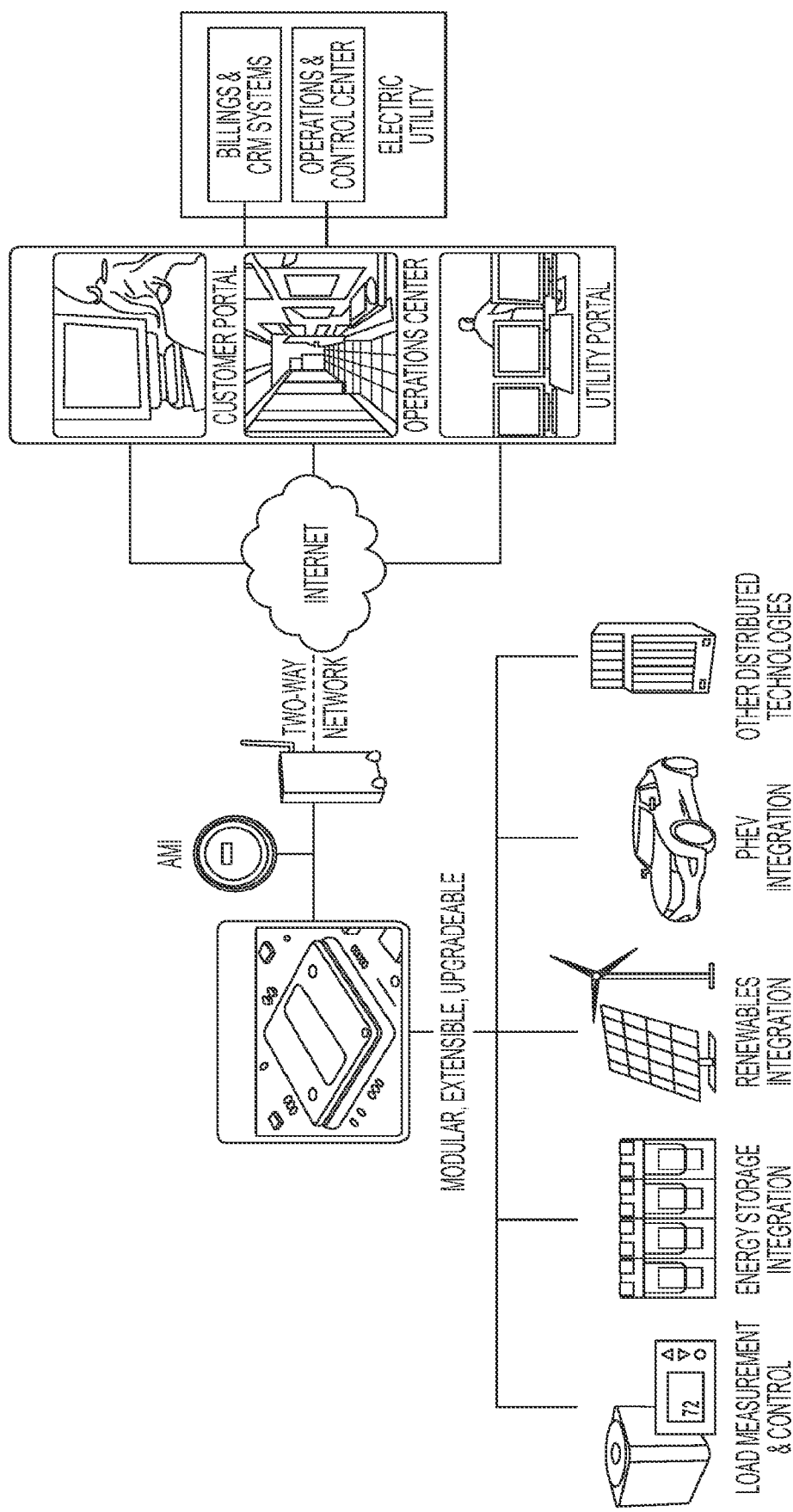
FIG. 3 illustrates another embodiment of how a home-based power control appliance can be connected to utility operations center.

FIG. 3 illustrates another embodiment of how a home-based power control appliance can be connected to utility operations center, which enables the utility to control the unit through utility-specific software applications such as a utility console, and may additionally allow a customer to monitor the unit through a password-protected website implemented, for example, on a utility control server.

Figure 4:
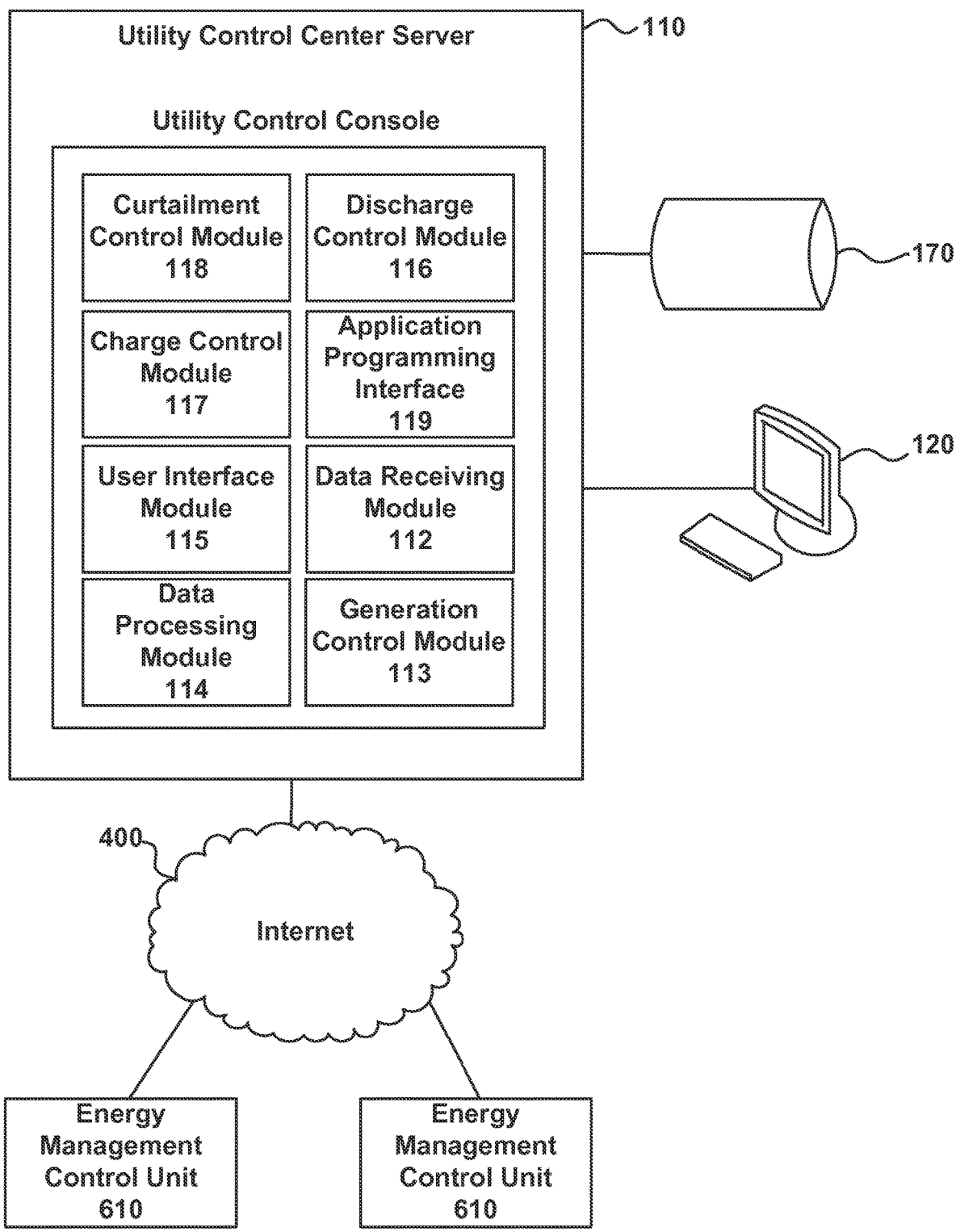
FIG. 4 is a conceptual diagram of a utility control center server which implements a utility control console.

FIG. 4 is a conceptual diagram of a utility control center server 110 which implements a utility control console. In one embodiment, the utility control console is comprised of five modules. A data receiving module 112 periodically receives measurements from geographically distributed energy management controllers 610, each of which may have energy storage capacity, such as a battery or a capacitor. A data processing module 114 processes measurements received by the data receiving module 112, the measurements comprising actual energy production capacity by devices controlled by the energy management controllers 610. The processing of those measurements may include applying system- and user-defined rules. Such processing may also include, for example, aggregating the measurements, applying algorithms to individual measurements and aggregating the results, and incorporating other data such as current and predicted weather data. Processed data may be stored on an external storage device 170 connected to the server 110.

A user interface module 115 displays data processed by the data processing module 114 on a display device 120 connected to the server 110 and allows end users to control functions provided by the utility control console modules using a graphical user interface supported by the display device. A discharge control module 116 transmits commands to energy management controllers 610 which, when appropriate, instruct controllers to discharge stored energy, for example, into a power grid through an inverter. A charge control module 117 transmits commands to energy management controllers 610 which, when appropriate, instruct the controllers to charge energy storage devices controlled by the controllers. A curtailment control module 118 transmits commands to energy management controllers 610 which, when appropriate, instruct to curtail the load of devices or circuits controlled by the controllers. An application programming interface 119 (API) enables the utility to use their own forecasting algorithms instead of the system's. A generation control module 113 transmits commands to energy management controllers 610, which, when appropriate, instruct the controllers to activate and deactivate generation sources controlled by the controller.

Figure 5A:
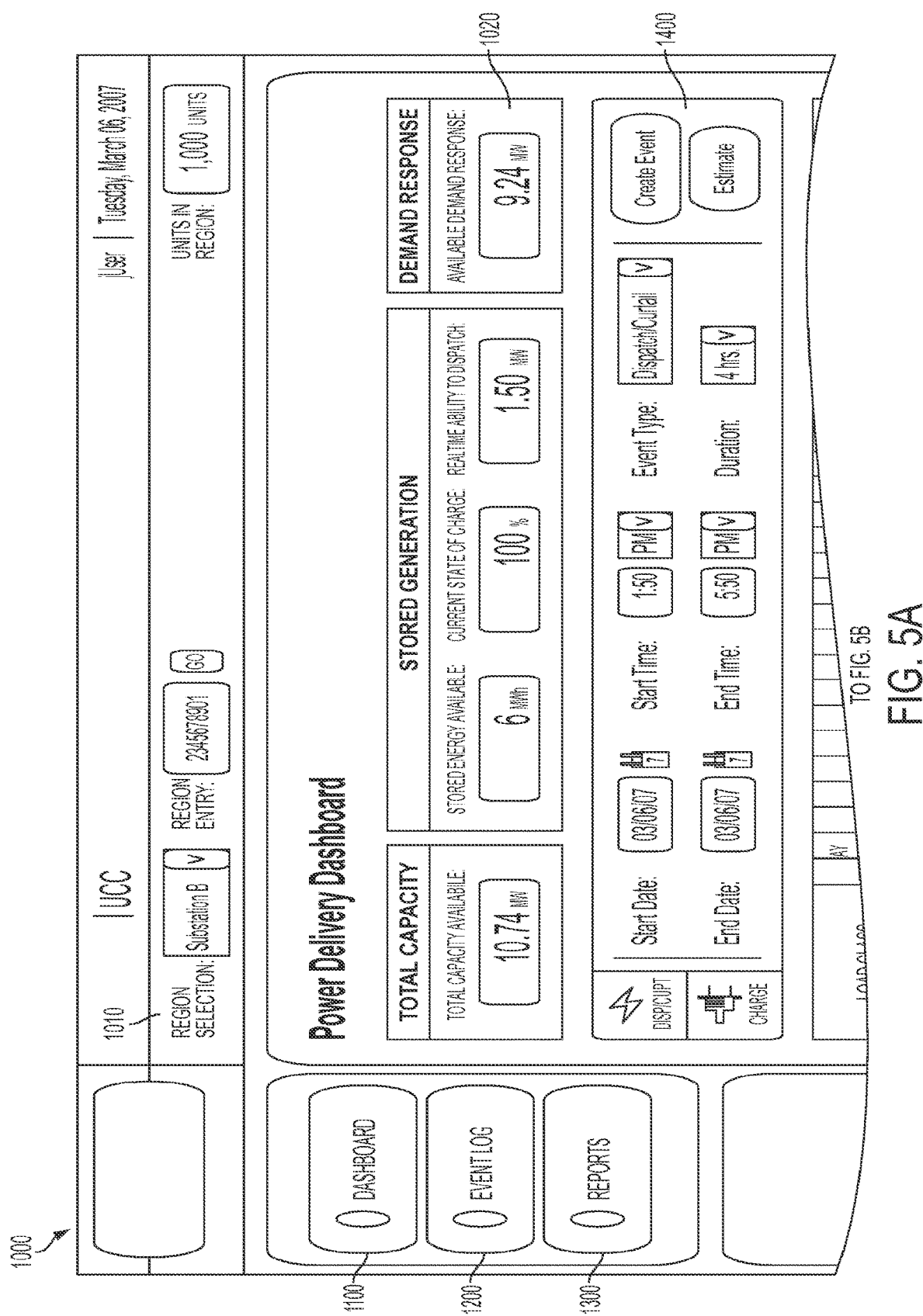
FIG. 5 (including FIG. 5 MAP and FIGS. 5A-5C) illustrates one embodiment of a demand response dashboard, which enables a utility to control and access power that is stored, generated, and managed through appliances.
Figure 5B:
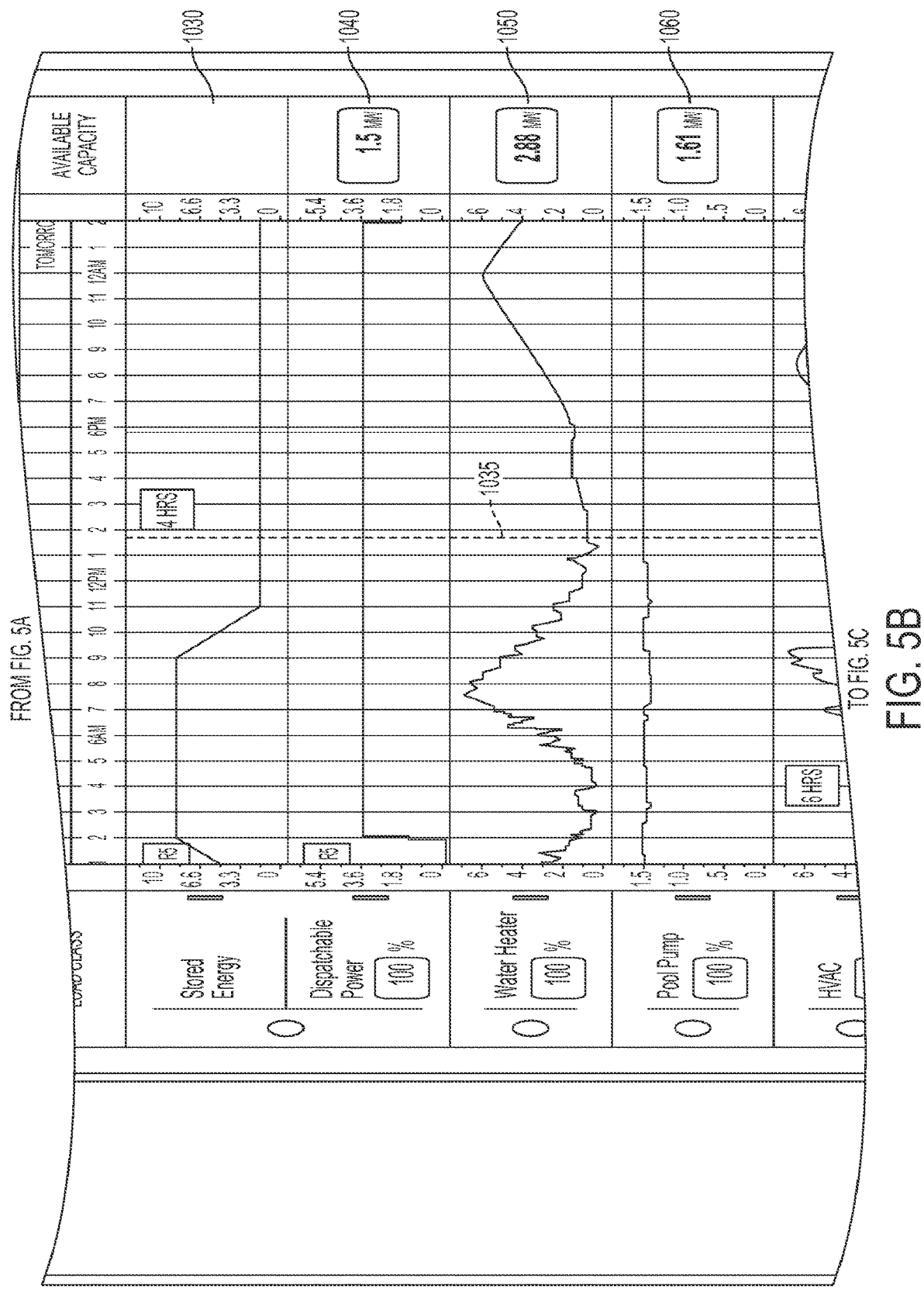
Figure 5C:
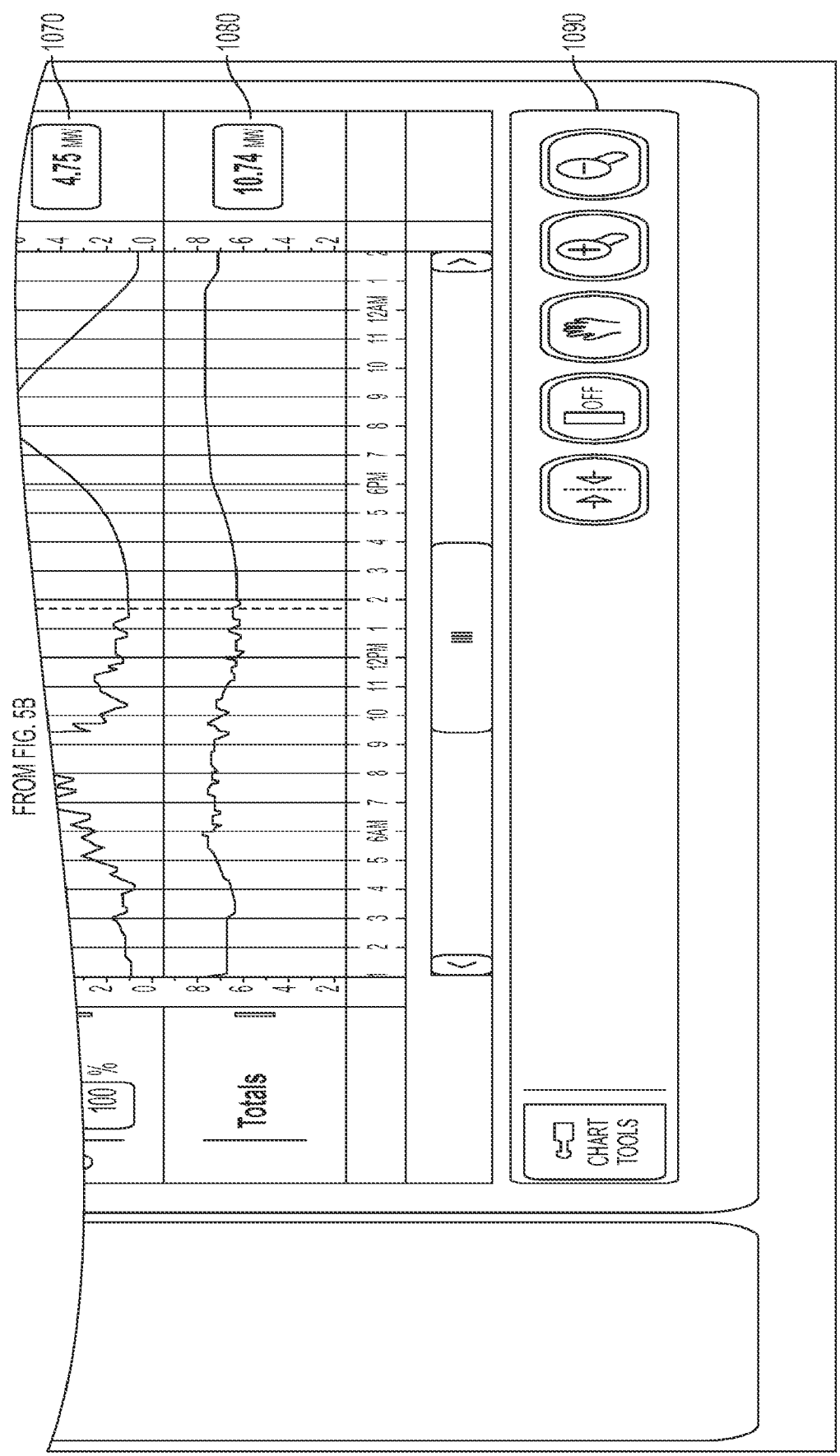

FIG. 5 illustrates one embodiment of a demand response dashboard 1000, which enables a utility to control and access power that is stored, generated, and managed through appliances. The interface has a selection bar 1010 which allows a user to select specific regions under a utility's control, for example, a substation, to manage and control. The selection bar 1010 displays the total number of units within the region. The interface has a summary bar 1020 which summarizes total capacity within the region which includes stored capacity and curtailable loads.

Detailed charts are displayed for stored energy 1030, and dispatchable power 1040. Detailed charts are also displayed for power consumed by curtailable load, in the case of the illustrated embodiment, water heaters 1050, pool pumps 1060, and HVACs 1070. The charts graphically displays, in real-time, immediate demand reduction potential available across a population of devices that are dispersed throughout the region that may be controlled from the console or a related computer. Demand reduction potential can be displayed based on category of demand reduction, such that the amount of potential demand reduction available from a certain category of devices (e.g., hot water heaters) is displayed and controllable separately from a different category of devices (e.g., pool pumps or air conditioners). The utility console may additionally provide the ability to monitor and manage performance across a service territory, the individual performance of a single unit, or the collective performance of a subset of units in the service territory (e.g. all units served by a given substation).

The area to the right of vertical line 1035 in detailed charts 1030 1040 1050 1060 1070 1080 represents load forecasts which are calculated by the system. Such forecasts are made using algorithms which may incorporate historical data, such as measured energy usage for specific classes of loads, and exogenous data such as predicted weather data.

In one embodiment, the electrical capacity displayed by the interface reflects actual storage in batteries in devices located in homes and/or businesses and coupled to the electrical grid. Such capacity may take into account the depth of discharge of individual batteries, such that batteries are not discharged beyond a certain limit, e.g., 80%. The immediate capacity may alternatively reflect the aggregated actual output supply of distributed energy resources, such as solar panels that are associated with and coupled to the devices.

Charts may be customized using chart tools 1090. The user may select the dashboard using a button 1100, or may switch to an event page or a report page using buttons 1200 and 1300 respectively. Utilities are thus enabled to isolate data and control appliances by region or defined groups. Filtering enables utilities to provide a direct impact to where power quality issues reside. Reports provided by the utility console application may include reports based on data captured by the appliances in the field. Reports may be filtered by groups or other criteria deemed required. One embodiment of these reports may compare the actual performance of an event versus the user's expectations.

Figure 6:
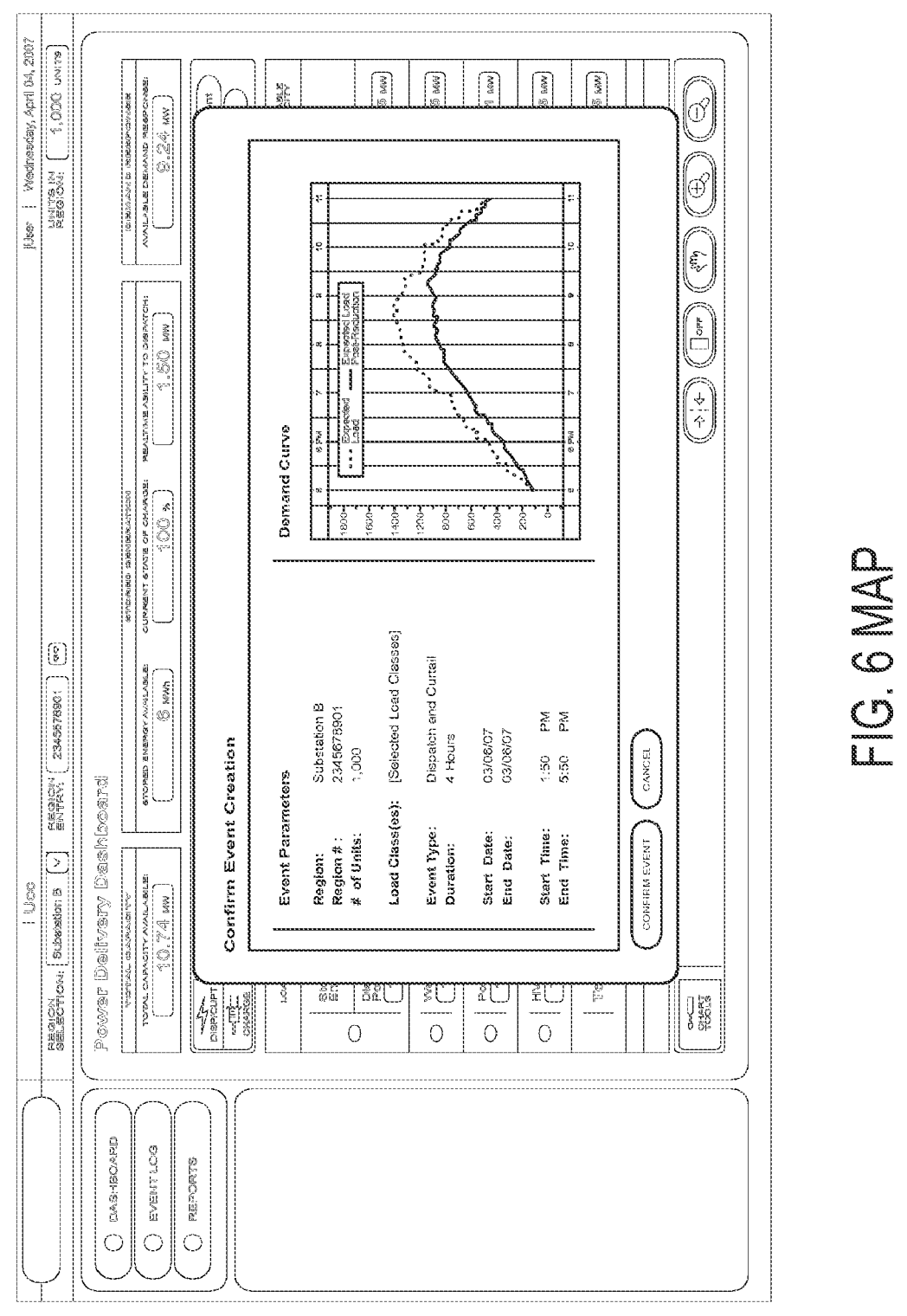
Figure 6A:
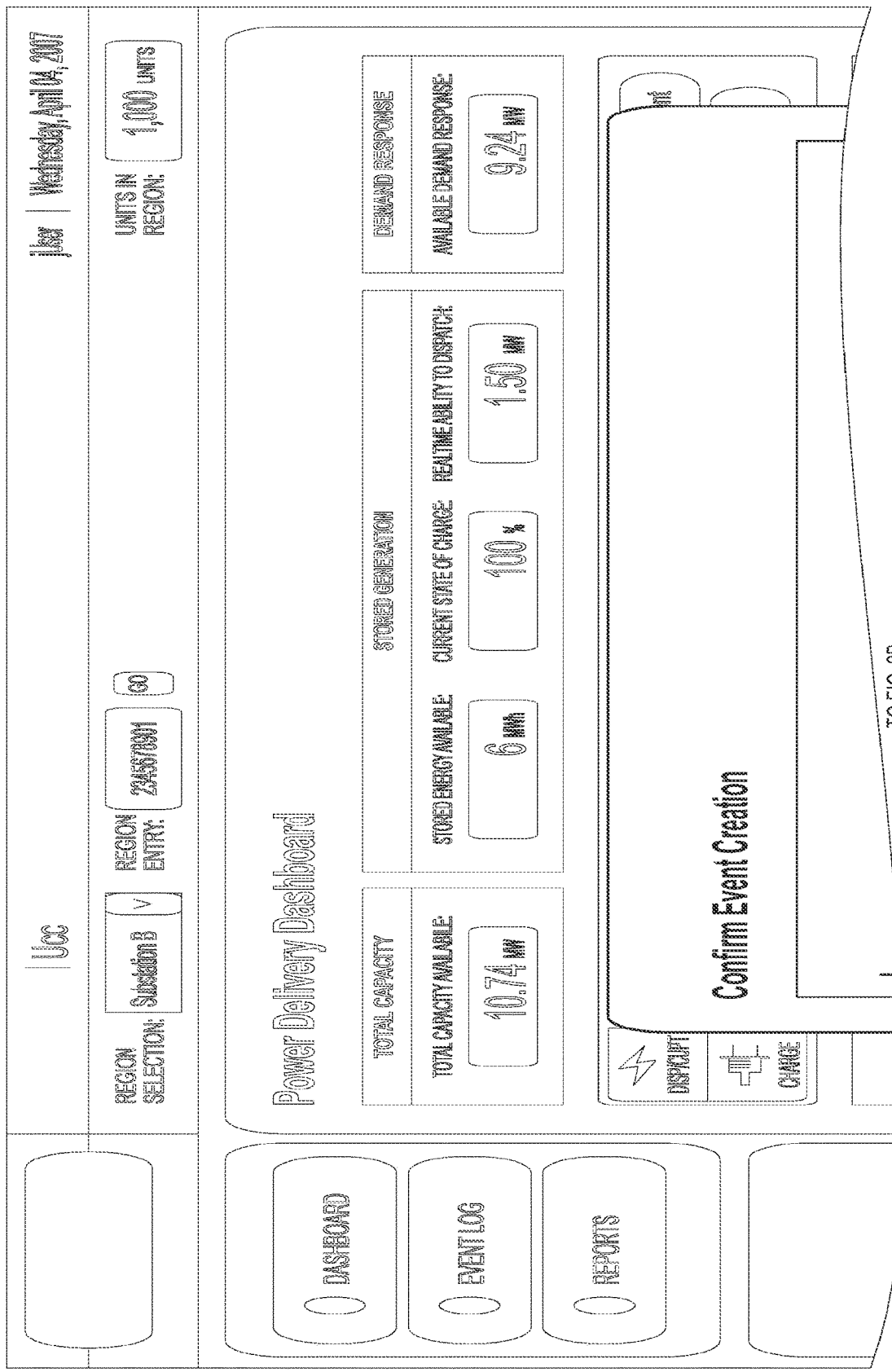
FIG. 6 (including FIG. 6 MAP and FIGS. 6A-6C) illustrates one embodiment of a confirmation page displayed when an event is created.
Figure 6B:
Figure 6C:
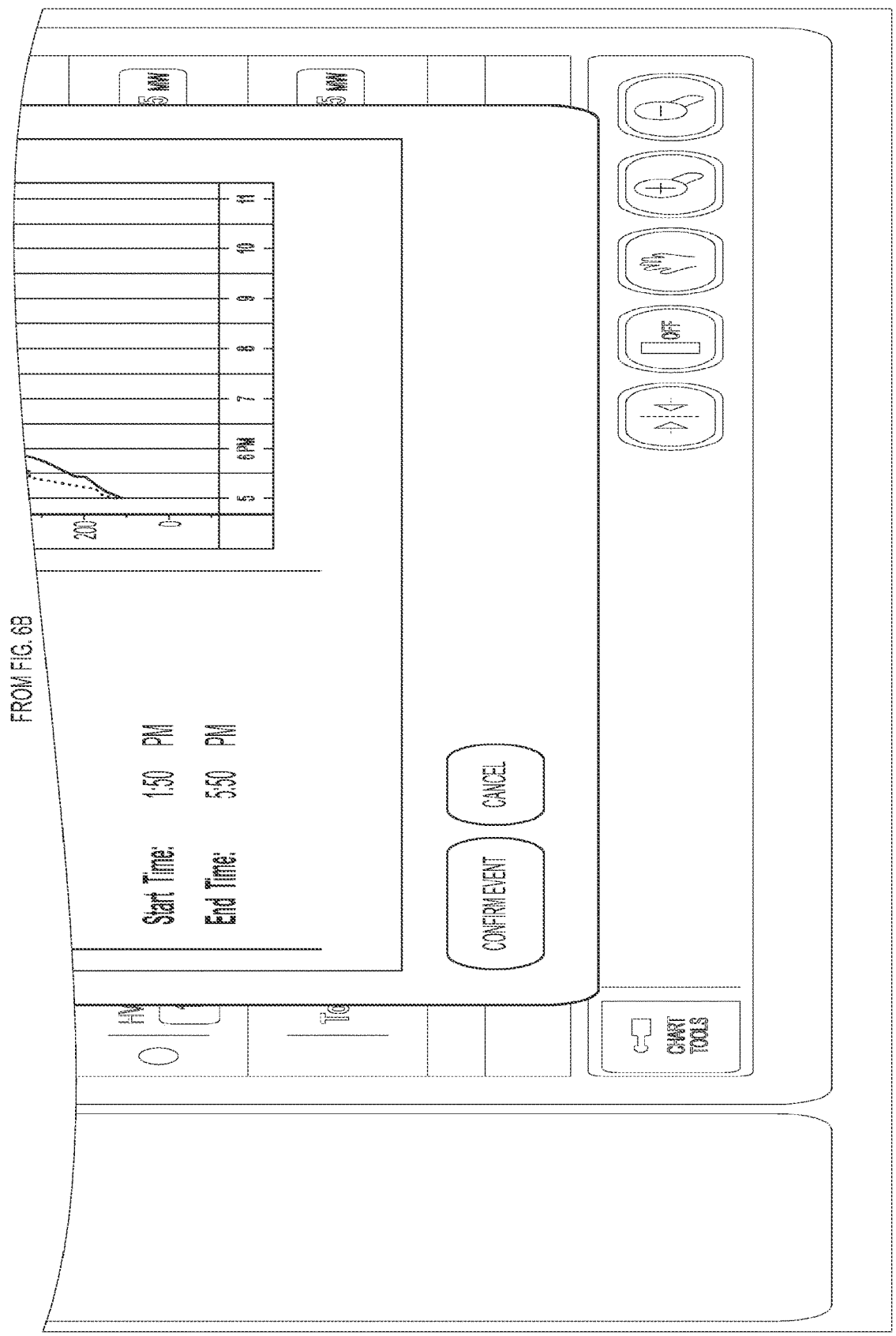

In one embodiment, devices within the region, such as dispatchable power sources and curtailable loads, are managed by creating events. Events may include demand response (DR) events, charge battery events, and charge energy storage events. The interface in FIG. 5, provides an event creation bar 1400. The type of event may be selected, as well as a start and end date, a start time and end time, and a duration tor the event. After the details of the event are selected, the create event button is selected. When the event is successfully created, a confirmation page, such as that shown in FIG. 6 may be displayed which may graphically display the expected load reduction.

Events may be generated, for example, to cause portions of the aggregated electrical storage and/or energy resources to be coupled to the electrical grid (e.g., through inverters), thus increasing supply to the grid. The console may be used, for example, to dispatch stored energy from batteries or distributed generation sources (wind, solar, generators, fuel cells, etc.), or a combination of both. When events are dispatched, commands may be transmitted to devices at the customer's premises to turn them on, off, or increase/decrease the settings (e.g., adjusting the temperature setting of a thermostat). Commands can be transmitted by structured messages (e.g., Internet messages) sent via a reliable delivery protocol such as IP or TCP so that communications are not materially disrupted due to ambient noise on communication channels (e.g., power lines).

Demand response events may take one of three forms: curtailment, dispatch (discharging synchronous reserves), or a combination of both curtailment and dispatch. Utilities may schedule battery charge events to maintain synchronous reserves levels and ensure charging occurs during the most optimal time periods. Utilities may schedule energy storage charge events to maintain synchronous reserves levels and ensure charging occurs during the most optimal time periods. The event creation bar further provides an estimate button which may estimate the effect of an event before it is dispatched.

Events may be scheduled in advance. For example, a control center operator may decide that a demand response event is needed for the following and win schedule such an event. The system can then automatically notify customers using their preferred notification mechanism (email, text message, etc.), and then send an execution schedule to all the customer sites. Each site replies with an acknowledgement of receipt of the schedule, and the console can report a high degree of confidence how much load can be expected to be shed (and energy dispatched) based upon the acknowledgement from each site as well as an aggregated estimate of the size of the expected reduction based upon historical measurements. At the scheduled time, energy management controllers at the sites will execute the curtailment and dispatch commands, record the performance and then report back to the utility console. In certain embodiments, energy dispatches can be scheduled to occur at a future time when demand is anticipated to be higher. During off-peak periods, batteries or other energy storage units can be recharged from the grid, solar panels, or other sources.

Events may also be generated on-demand for immediate execution as the need arises. The speed at which these events can be executed is a function of the latency of the communications network. With broadband Ethernet or a typical two-way communications via meters, for example, the event can be executed less than five minutes from the control center operator issuing the command.

In some embodiments, a system incorporating the invention may utilize the real-time measurements of the loads in iterative predictions of an event's performance while the event is underway. In the event a revised prediction indicates that the goal of that event is not expected to be achieved or achieved more effectively, the system may suggest alternatives to reaching that goal or may react automatically (based upon previously defined constraints or rules) to attempt to reach the goal.

The system may further provide a DR event suggestion function. The end user at a utility could be enabled to enter a query such as, "Show me 10 MW on this Day at this Start Time" and query event options presented to them for selection. The control center console may generate suggestions which are based in part upon previously defined rules and constraints and may include both the cost and the benefit of the various scenarios, presenting the optimal scenarios to the user. Cost may be in terms of dollars, reliability, greenhouse gasses, or any other metric the utility may deem a cost.

In one embodiment, the capacity of electrical storage displayed by the utility console may be "immediate" in that it reflects the actual measured output of a currently-producing asset, such as a solar panel, which can be diverted to the grid (e.g., a solar panel that is presently charging batteries in a home can be diverted to produce electricity for the grid.)

It can also be "immediate" in the sense that a particular homeowner or business owner can, by altering mode settings on their power control appliance, alter the availability of production.

For example, a homeowner who wants to ensure that his or her batteries are fully charged before offering any excess capacity to the grid can select a mode that prevents diversion until such charging has been completed. The utility console may reflect this fact by not showing capacity for such units until a future time—for example, an estimated time after which the batteries would be fully charged. If the consumer changes a mode setting, that potential capacity can be promptly reflected on the console. A homeowner may also prevent the system from reducing the thermostat beyond a certain point if a certain mode has been selected.

In one embodiment, a utility can offer cost savings to individual customers based on mode selection settings made by the customer. For example, a customer that has selected the most aggressive form of demand management (e.g., temporarily shutting down the maximum number of devices) could be offered a discount or cost reduction on utility bills to compensate for the potential inconvenience of disabling certain devices. Similar discounts or rebates can be offered in exchange for diverting stored energy (e.g., from batteries) or passive (e.g., solar cells) or active (e.g., generators) associated with an individual device back to the grid.

Events may also be generated, for example, to satisfy electrical demands while minimizing the greenhouse gasses produced by the devices that satisfy that demand. A utility may place a higher priority on limiting greenhouse gas emissions than on cost, and subsequently will create and manage DR events in order to minimize their greenhouse gas production. For example, the utility may create rules for the invention which instruct it to display event recommendations based primarily on the amount of greenhouse gas the event would produce.

After a DR event has been completed, the measured performance can be reported to the utility or other user. The report can present the data in groups, such as the aggregate performance of all units by the substation serving them. In certain variations, the utility console can constantly measure and record a load profile for each circuit, providing an accurate baseline that is specific to a particular customer. This enables a utility to offer a DR program that is equitable to all participants, compensating them for the load they actually reduced as opposed to using a statistical sampling.

In one embodiment, the utility console may display the cost of various demand-side management scenarios with costs in terms of money, environmental impact, greenhouse gasses, etc. to the utility, such that the utility can see how much it would cost to activate various demand reduction scenarios. For example, by shutting off all pool pumps that are currently activated, a certain amount of demand reduction would be achieved, and the utility could be charged a fee of a certain amount. By shutting off all water heaters that are currently activated, the utility could achieve a different level of demand reduction and might be charged a potentially different fee. These costs can be traded off against the costs of firing up additional power plants or other parameters.

In one embodiment, the system may further implement multiple sets of rules and constraints which govern how the various resources (e.g. energy storage, load control, distributed renewable energy resources, etc.) may be used. For example, there may be a constraint that energy storage units must reserve 50% of their total capacity for usage by the utility's customer as backup power. Such constraints and rules may apply to a single unit, a collection of units, or the entire population of units. In another example, the control center operator may specify the rate of discharge of energy storage units. Units discharging at 50% of capacity can dispatch for twice as long as units dispatching at 100%. The control center operator can choose the dispatch profile the best suits the need at hand.

In another embodiment, the system may further implement multiple sets of rules and constraints which govern how the combination of various resources, e.g. energy storage plus load control, may be used. For example, if a utility desires to reduce its current load by 50 megawatts, the system may process rules which indicate an optimal solution can be achieved via 30 megawatts of power through dispatching energy storage and 20 megawatts through load curtailment.

In an even more complex example, a rule set may dictate that if the price of power is less than $200 per megawatt-day, batteries may discharge up to 50% of their capacity in a single cycle; if the price of power is greater than $200 per megawatt day but less than $400 per megawatt day, batteries may discharge up to 65% of their available capacity in a single cycle; and if the price of power is greater than $400 per megawatt-day, batteries may discharge up to 80% of their capacity in a single cycle. The system may then calculate and display the amount of available energy storage capacity based upon the current or expected price of power.

By implementing peak load reduction and energy shaping, the system may reduce incremental transmission and distribution investments. For example, the system may help relieve focalized transmission and distribution issues by identifying an overstressed substation or feeder line. Deploying units to 5% of the affected areas may substantially increase reliability of the network. By controlling which loads reconnect to the grid, the utility can stagger the reconnecting loads after brief and extended outages to assist with outage recovery management. In addition, units with energy storage capacity can be instructed to discharge immediately after reconnecting to the grid to lessen the impact of loads reconnecting.

Figure 7:
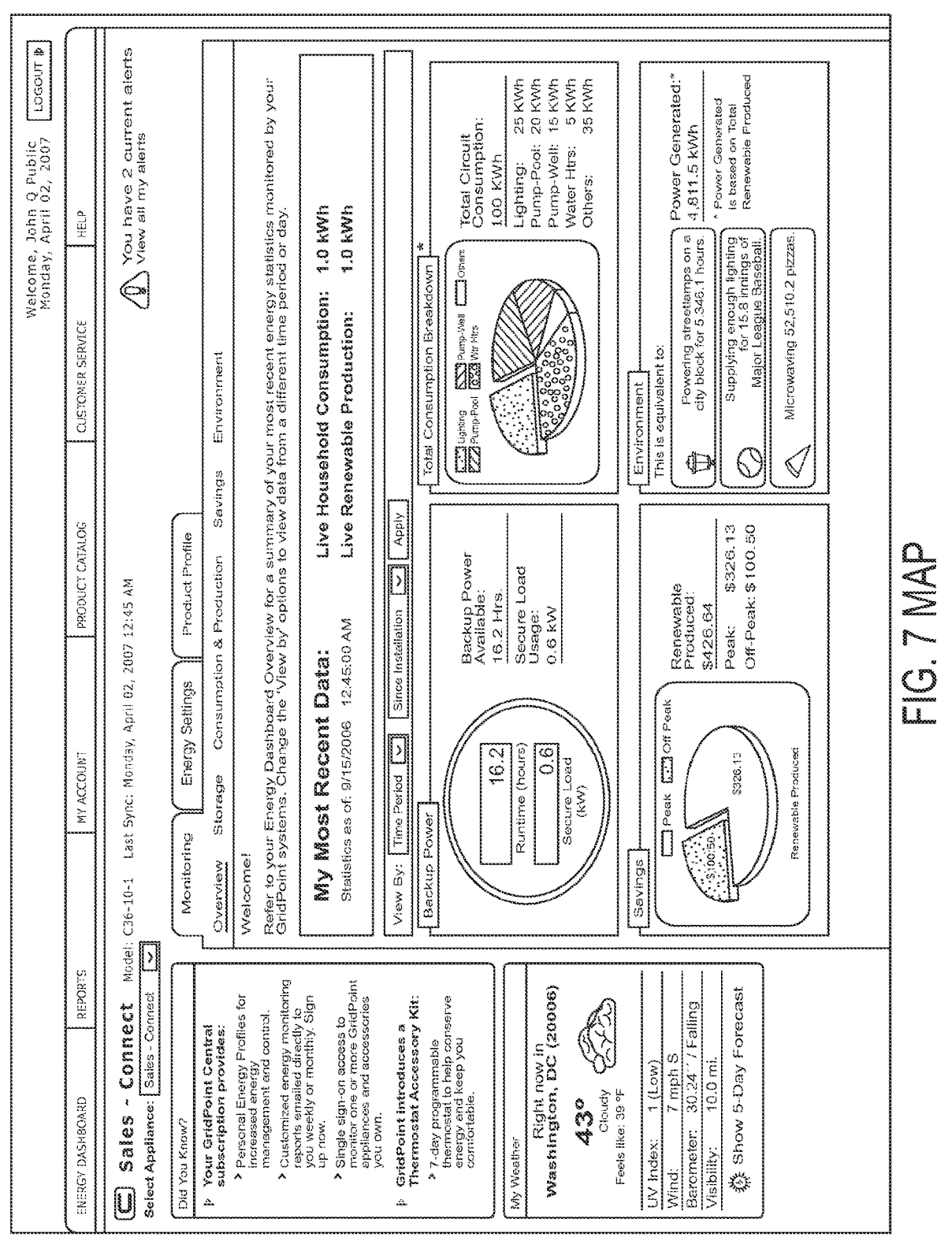
Figure 7A:
FIG. 7 (including FIG. 7 MAP and FIGS. 7A-7B) shows one embodiment for a web-based user interface that permits individual customers to monitor electrical consumption, savings, and associated environmental impact.
Figure 7B:
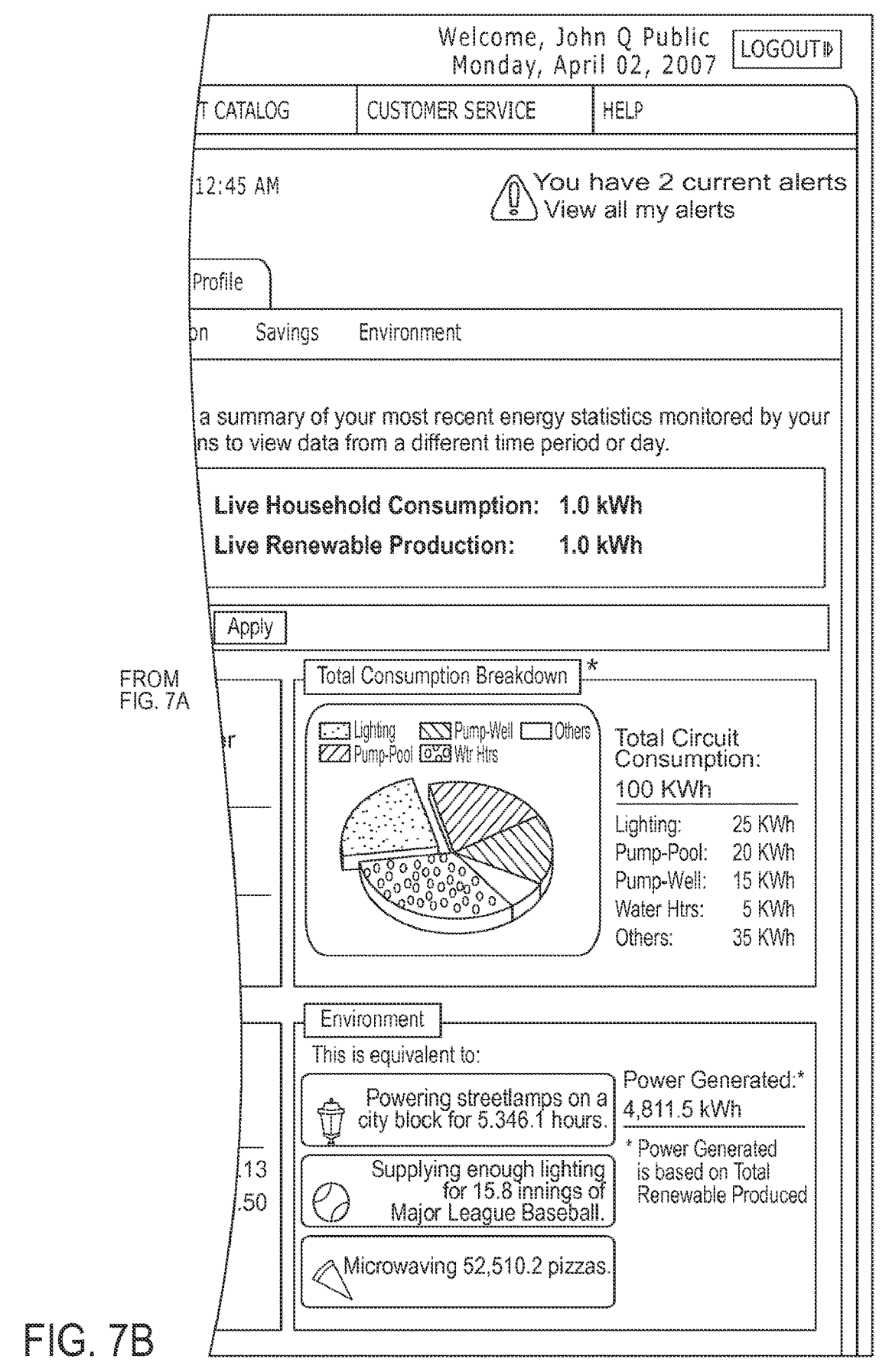

The data collected by the utility console may be used to provide consumers with on demand information regarding the consumer's energy uses. FIG. 7 shows one embodiment for a web-based user interface that permits individual customers to monitor electrical consumption, savings, and associated environmental impact. Access to the website can be limited to customers having power control appliances. Statistics can be compiled and presented using a web-accessible format as illustrated in FIG. 7.

Combining power control appliances with a utility control console enables the provision of value-added services in addition demand side management. Such services may include backup power (for example, using the stored energy, utilities can sell consumers clean, maintenance free backup power service); energy management (utilities can offer customers energy conservation services to reduce electricity cost while fulfilling the utility's energy shaping requirements); benefits within time-of-use pricing schedules. In certain embodiments, consumers can expect 10-15% energy cost savings by controlling major consumption items: HVAC, water heaters, pool pumps, etc. Additionally, the utility can provide its customers with detailed consumption information, and translate conservation activities into tangible environmental benefits.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

We claim:

1. A method of controlling energy consumption of a plurality of energy consuming devices at a premises, each of the plurality of energy consuming devices being controlled by a corresponding load controller, each load controller being communicatively coupled to one of a plurality of distributed energy management controllers, the plurality of distributed energy management controllers being communicatively coupled to a computer system of an operations control center, comprising:
    sending a notification of a demand response request from the operations control center to customers associated with each distributed energy management controller, the notification including a schedule of an associated demand response event;
    receiving acknowledgement of the demand response request from one or more customers associated with each one of the plurality of distributed energy management controllers;
    transmitting a command from the operations control center to at least one of the plurality of distributed energy management controllers to curtail or engage one or more of the plurality of energy consuming devices according to the schedule of the associated demand response event;
    generating, by the computer system of the operations control center, a report that indicates how much load can be expected to be shed from each premises associated with a corresponding energy management controller based upon the acknowledgement from each customer and an aggregated estimate of a size of an expected load reduction based on historical load measurements; and
    executing, by the energy management controllers at the premises, the curtail or engage commands at a scheduled time according to the schedule of the associated demand response event.

2. The method of claim 1, wherein at least one of the plurality of distributed energy management controllers is controlled by a consumer using a graphical user interface and is also being remotely controlled by a utility.

3. The method of claim 1, further comprising:
    transmitting energy usage data and conservation data from at least one of the plurality of distributed energy management controllers associated with a consumer to the operations control center; and
    displaying the energy usage data and conservation data to the consumer via a website.

4. The method of claim 1, further comprising:
    controlling the plurality of distributed energy management controllers by the operations control center; and
    monitoring the at least one of the plurality of distributed energy management controllers by a consumer via a website provided by the operations control center.

5. The method of claim 1, further comprising:
    communicating individual energy load measurements from each load controller to a corresponding one of the plurality of distributed energy management controllers;
    communicating the individual energy load measurements of each of the plurality of energy consuming devices from the plurality of distributed energy management controllers to the operations control center; and processing, by the computer system, the individual energy load measurements received from the plurality of distributed energy management controllers,
wherein each load controller has an integrated measurement capability.

6. The method of claim 5, wherein the individual energy load measurement is a demand measurement.

7. The method of claim 5, wherein the individual energy load measurement is an energy use measurement.

8. The method of claim 5, wherein the individual energy load measurement is an energy consumption measurement.

9. The method of claim 5, wherein the processing further comprises:
aggregating data from individual energy load measurements of a plurality of the energy consuming devices.

10. The method of claim 5, wherein the processing further comprises:
applying algorithms to individual energy load measurements; and
aggregating results of the algorithms.

11. The method of claim 5, wherein the processing further comprises:
applying algorithms to the individual energy load measurements; and
associating current and predicted weather data with the individual energy load measurements.

12. The method of claim 5, wherein the processing further comprises:
applying algorithms to individual energy load measurements; and
applying user-defined rules to the individual energy load measurements.

13. The method of claim 5, further comprising:
performing, by the computer system of the operations control center, calculations on real-time measurements of the individual energy loads in iterative predictions of a size of an expected load reduction during the demand response event while a demand response event triggered by the command is underway; and
determining, by the computer system of the operations control center, based on revised predictions, if a target size of the expected load reduction during the demand response event is not expected to be achieved, or may be achieved more effectively, and if so, automatically alter the command based upon defined constraints and rules.

14. The method of claim 1, wherein each of the plurality of distributed energy management controllers executes the curtailment commands associated with the demand response request, records a performance of the demand response event triggered by the demand response request, and reports the performance of the demand response event back to the operations control center.

15. The method of claim 1, further comprising:
aggregating, by the computer system of the operations control center, categories of real-time energy load data associated with one or more of the plurality of distributed energy management controllers;
displaying, by the computer system of the operations control center, on a utility console, the aggregated categories of individual real-time energy load data over a first predetermined time period;
calculating, by the computer system of the operations control center, load forecasts for categories of the energy consuming devices using historical measured energy usage, the forecasts representing demand reduction potential available from selected categories of curtailable loads; and
displaying, by the computer system of the operations control center, the load forecasts on a time scale representing future demand reduction potential.

16. The method of claim 15, wherein the load forecast calculation uses exogenous data.

17. The method of claim 1, wherein the command is a demand response command that instructs at least one of the plurality of distributed energy management controllers to curtail energy use of one or more categories of power consuming devices, further comprising:
controlling, by the computer system of the operations control center, one or more load controllers to reduce energy consumption of one or more categories of energy consuming devices;
receiving, by the computer system of the operations control center, a load profile of an individual circuit of a customer;
comparing, by the computer system of the operations control center, the load profile of the individual circuit to an actual load during the demand response event; and
compensating, by the computer system of the operations control center, the consumer for an actual customer's individual load that was reduced.

18. The method of claim 1, wherein at least one load controller is a thermostat.

19. A method of controlling energy consumption of a plurality of energy consuming devices at a premises, each of the plurality of energy consuming devices being controlled by a corresponding load controller, each load controller being communicatively coupled to one of a plurality of distributed energy management controllers, the plurality of distributed energy management controllers being communicatively coupled to a computer system of an operations control center, comprising:
sending a notification of a demand response request from the operations control center to customers associated with each distributed energy management controller, the notification including a schedule of an associated demand response event;
receiving acknowledgement of the demand response request from one or more customers associated with each one of the plurality of distributed energy management controllers;
transmitting a command from the operations control center to at least one of the plurality of distributed energy management controllers to curtail or engage one or more of the plurality of energy consuming devices according to the schedule of the associated demand response event;
performing, by the computer system of the operations control center, calculations on real-time measurements of individual energy load measurements in iterative predictions of a size of an expected load reduction during the demand response event, triggered by the command from the operations control center while the demand response event is underway;
determining, by the computer system of the operations control center, based on the iterative predictions, if a target size of the expected load reduction during the demand response event is not expected to be achieved or may be achieved more effectively, and if so, automatically altering the command based upon defined rules;

generating, by the computer system of the operations control center, a report that indicates how much load can be expected to be shed from each premises associated with a corresponding energy management controller based upon the acknowledgement from each customer and an aggregated estimate of a size of an expected load reduction based on historical load measurements; and executing, by the energy management controllers at the premises, the curtail or engage commands at a scheduled time according to the schedule of the associated demand response event.

* * * * *